United States Patent [19]

Sheppard et al.

[11] 4,206,935
[45] Jun. 10, 1980

[54] MOTOR VEHICLE ROLL CONTROL SYSTEM

[75] Inventors: Thomas H. Sheppard, Hitchin; Richard L. Paddison, Ampthill, both of England

[73] Assignee: General Motors Corporation, Detroit, Mich.

[21] Appl. No.: 951,391

[22] Filed: Oct. 16, 1978

[30] Foreign Application Priority Data

Oct. 21, 1977 [GB] United Kingdom ............... 43918/77

[51] Int. Cl.² ............................................. B60G 11/18
[52] U.S. Cl. .................................................. 280/723
[58] Field of Search ................... 280/73 TL, 684, 695, 280/700, 721, 723

[56] References Cited

U.S. PATENT DOCUMENTS

| 3,029,090 | 4/1962 | Wilfert | 280/723 |
| 3,490,786 | 1/1970 | Ravenel | 280/721 |

FOREIGN PATENT DOCUMENTS 1160313 12/1963 Fed. Rep. of Germany .......... 280/723

Primary Examiner—John J. Love
Assistant Examiner—Norman L. Stack
Attorney, Agent, or Firm—Dean L. Ellis

[57] ABSTRACT

A motor vehicle roll control system in a motor vehicle having a suspension system including one or more anti-roll bars, said motor vehicle being a dual-purpose vehicle for both road use and off-road use, which roll control system includes anti-roll force adjustment means whereby the action of said anti-roll bars can be eliminated or modified within predetermined limits, either manually or automatically, to compensate for changes in terrain traversed by said vehicle.

1 Claim, 9 Drawing Figures

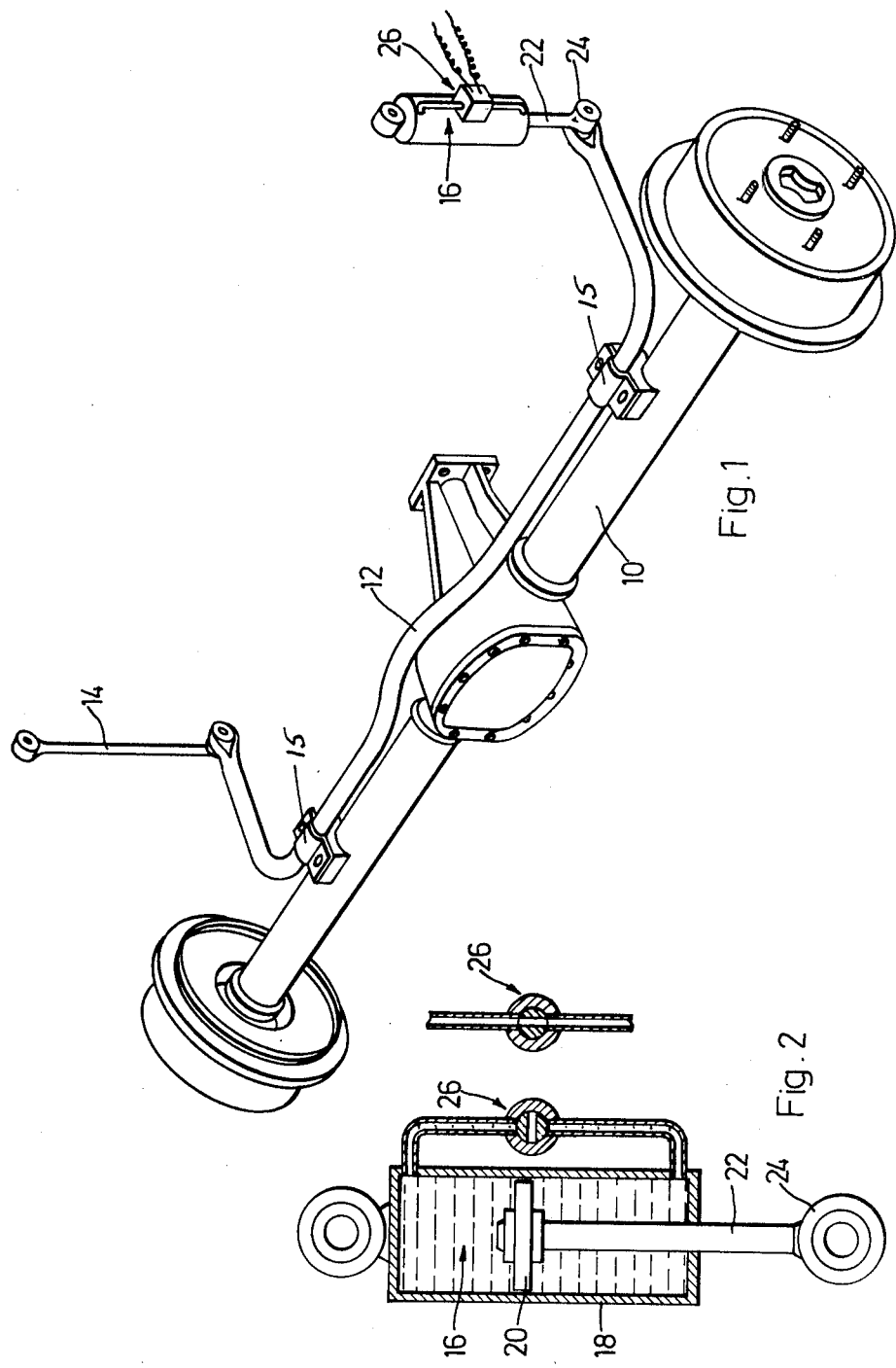

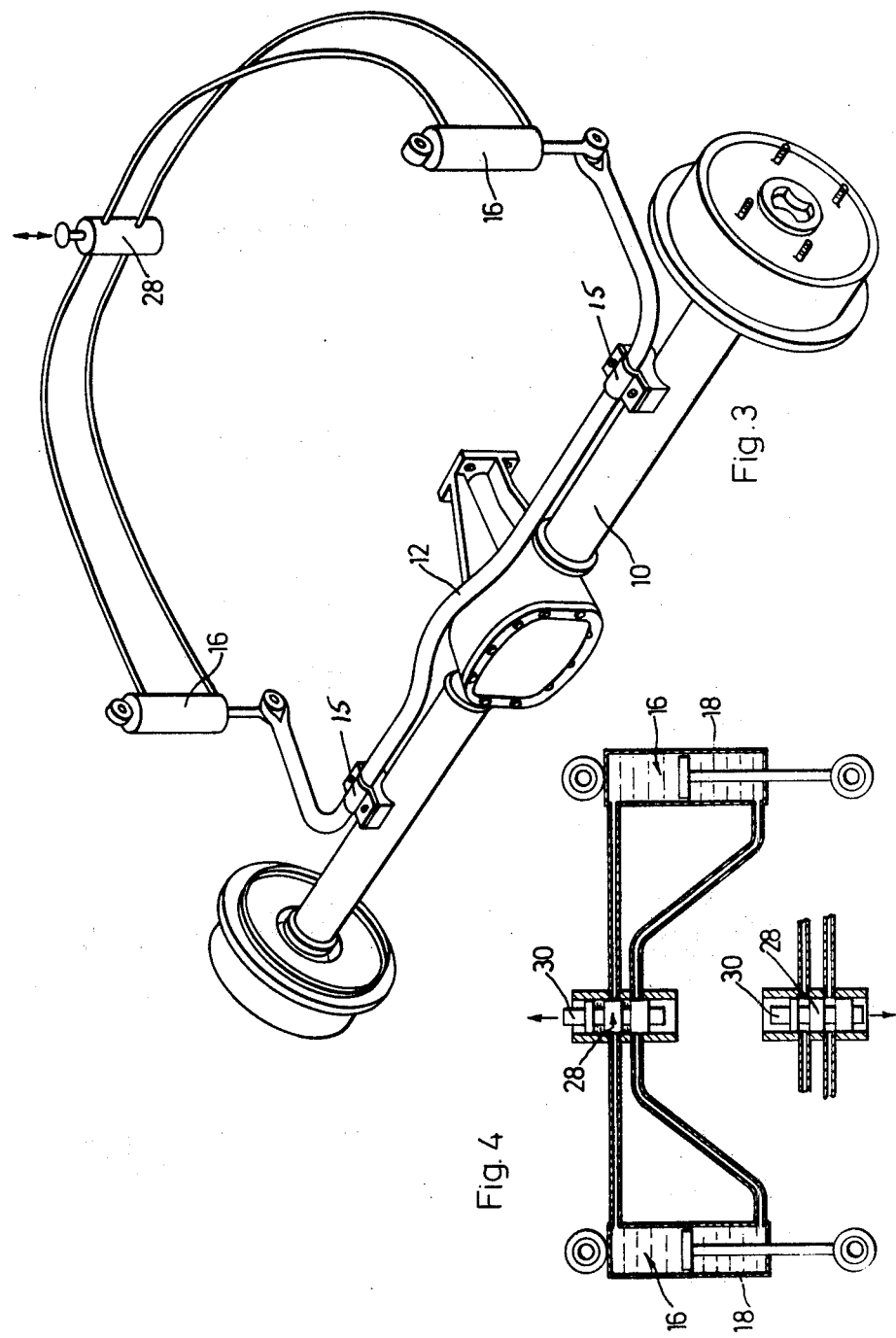

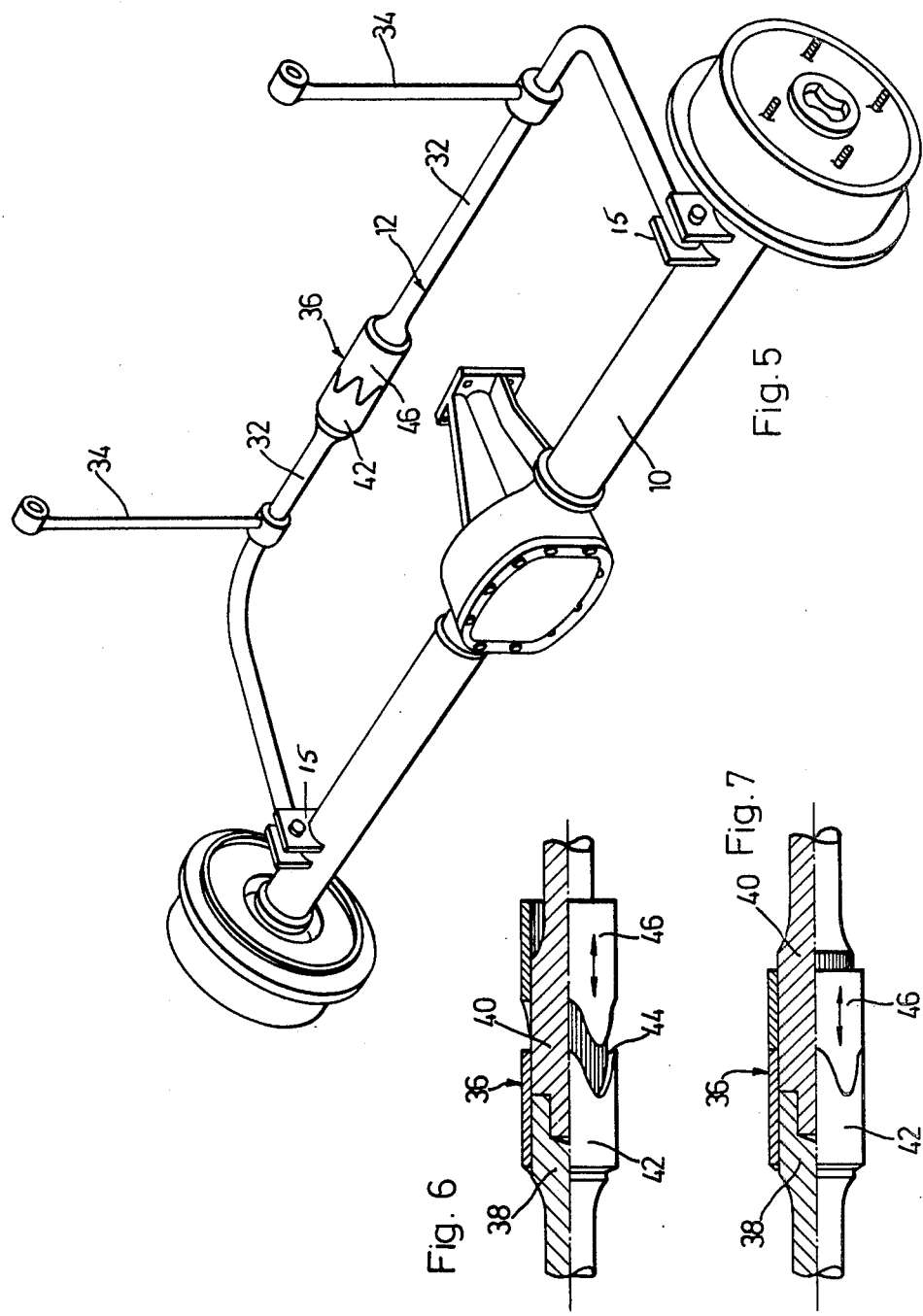

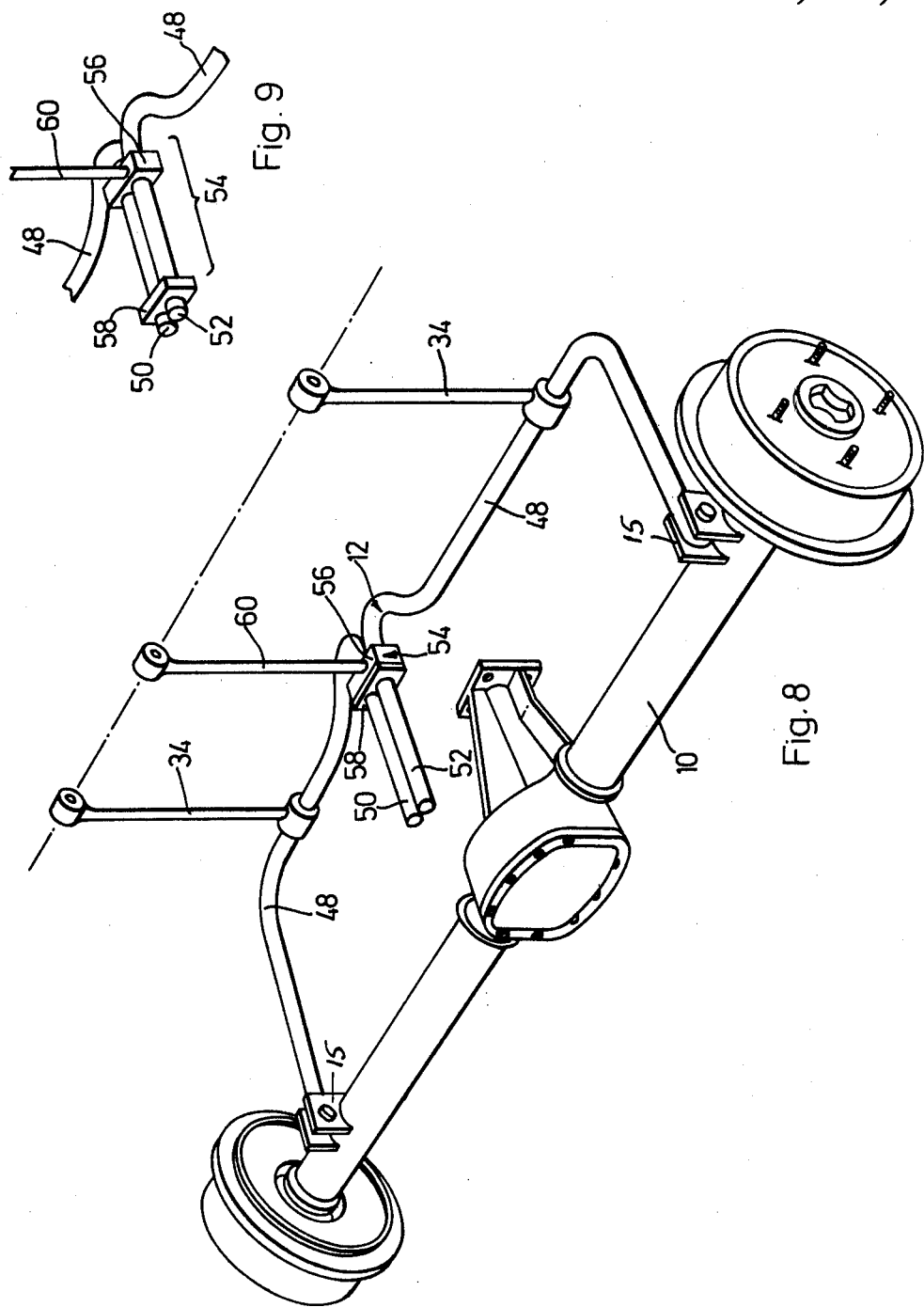

MOTOR VEHICLE ROLL CONTROL SYSTEM

This invention relates to a motor vehicle roll control system to stabilise the tendency of a sprung portion of a motor vehicle to tilt laterally relative to an unsprung portion of said vehicle when said vehicle is in motion. In particular, it concerns a system applicable to an off-road vehicle to enable such a vehicle to exhibit suitable suspension characteristics for both on-road use and off-road use.

According to the present invention, in a motor vehicle having a suspension system including one or more anti-roll bars, a motor vehicle roll control system includes anti-roll adjustment means whereby the action of said anti-roll bars can be eliminated or modified within predetermined limits, either manually or automatically, to compensate for changes in terrain traversed by said vehicle.

With such an arrangement, the behaviour of the suspension system can be adjusted so that in conditions of very irregular terrain, the action of the anti-roll bars is eliminated or substantially reduced, so that the wheels of the vehicle can move into and out of ruts and gullies in the ground surface traversed by the vehicle without appreciable loss of traction between said wheels and the ground surface.

Similarly, under good road conditions, the anti-roll bars can be made fully effective to give a vehicle ride characteristic appropriate to that expected for a vehicle intended for on-road use.

Preferably the means controlling the action of said anti-roll bars are actuated automatically when the vehicle reaches a predetermined speed limit for off-road use. Alternatively, said controlling means may be actuated by selection of either a specific gear ratio or of two wheel drive instead of four wheel drive.

The invention and how it may be performed are hereinafter particularly described with reference to the accompanying drawings, in which:

FIG. 1 is an isometric view of a rear axle of a vehicle fitted with a first embodiment of the present invention;

FIG. 2 is a cross-sectional view of the suspension unit shown in FIG. 1;

FIG. 3 is an isometric view of a rear axle of a vehicle fitted with a second embodiment of the present invention;

FIG. 4 is a cross-sectional view of components shown in FIG. 3;

FIG. 5 is an isometric view of a rear axle of a vehicle fitted with a third embodiment of the present invention;

FIG. 6 is a view, partially in cross-section of a coupling device shown in FIG. 5 in a disengaged position;

FIG. 7 is a view, partially in cross-section of the coupling device shown in FIG. 6 when in an engaged position;

FIG. 8 is an isometric view of a rear axle of a vehicle fitted with a fourth embodiment of the present invention; and FIG. 9 is an isometric scrap view of a portion of the fourth embodiment of the invention shown in FIG. 8.

In a first embodiment of the invention shown in FIGS. 1 and 2, there is illustrated the rear axle 10 of a vehicle equipped with an anti-roll bar 12, one end of which is coupled to an unsprung portion of the body of the vehicle (not shown) by means of a rigid pivoted link 14, and the other end of which is coupled to said unsprung portion of the body of the vehicle by means of a modified hydraulic suspension strut 16, shown in an enlarged cross-section in FIG. 2. The anti-roll bar 12, is pivotally coupled to a sprung portion of the vehicle, namely the rear axle 10, by the two bracket mountings 15. The remainder of the suspension system of the vehicle is a conventional one, and may include conventional suspension springs, either leaf springs or coil springs, and/or conventional hydraulic suspension struts. Such conventional suspension items are well known in the art and may be constructed and arranged as desired and, for these reasons, no detailed description of the construction or the arrangement of the remainder of the suspension will be given for any of the four embodiments of the invention hereinafter particularly described. The modified suspension strut shown in FIG. 2 comprises a cylinder 18 pivotally connected at one end to the body of the vehicle, in which cylinder can reciprocate a piston 20 carried on a connecting rod 22 pivotally connected at its free end 24 to the end of the anti-roll bar 12. The cylinder 18 is filled with hydraulic fluid above and below the piston 20, and there is a separate valved connection 26 between the top and the bottom of the cylinder. With the valve 26 in a closed condition, as shown in the main figure of FIG. 2, there is no interconnection between the top and the bottom of the hydraulic cylinder 18 and effective movement of the piston 20 within the cylinder 18 is prevented. Consequently the modified suspension strut 16 exhibits the same physical effect on the anti-roll bar 12 as would be achieved by a pivoted rigid strut. Thus, when the valve 26 is in the closed position, the vehicle is provided with a fully operative anti-roll bar suspension arrangement, as required for driving the vehicle under good road conditions.

On the other hand, if the valve 26 is placed in the open position, as shown in the scrap view of FIG. 2, then fluid communication is established between the top and the bottom of the hydraulic cylinder 18, and the piston 20 can move up and down the cylinder 18 without undue difficulty. Consequently, this freedom of movement of the piston 20 within the cylinder 18 substantially eliminates the effectiveness of the anti-roll bar 12 in controlling the roll characteristics of the vehicle. With the valve 26 in this open position, the suspension of the vehicle is thus modified to a degree which allows a freedom of axle movement not limited in any way by the anti-roll bar 12; by allowing the wheels to maintain contact with the ground despite severe lateral irregularities, the vehicle can display the traction characteristics required when driving it under off-road conditions. The position of the valve 26 could be adjusted manually, preferably by making the valve 26 an electrically operated valve controlled by switch means (not shown) accessible to the driver of the vehicle. A preferred construction would incorporate this switch means within the gear box of the vehicle such that, on selecting a predetermined gear, switching of the valve 26 from one position to the other position would occur automatically. Alternative methods of operating the valve 26 could be used, including, for example, pneumatic actuation and hydraulic actuation.

In a second embodiment of the invention, illustrated in FIGS. 3 and 4 of the accompanying drawings, both ends of the anti-roll bar 12 are equipped with modified hydraulic suspension units 16 similar to that used in the first embodiment, the top and the bottom of each of the cylinders 18 concerned being linked hydraulically to the corresponding top and bottom of the other cylinder 18 by means of a common shuttle valve 28, shown in cross-section in FIG. 4. When this common shuttle valve 28 is in the closed position shown in the full view of FIG. 4, then the hydraulic communication between the cylinders 18 is cut-off. In these circumstances, each of the modified suspension struts 16 acts as a rigid strut, and the anti-roll bar 12 becomes fully effective, as is required for on-road use of the vehicle. On the other hand, if the valve element 30 in the common shuttle valve 28 is opened, as shown in the scrap view of FIG. 4, then hydraulic communication is established between the tops and the bottoms of the cylinders 18, with the result that each piston 20 in each cylinder 18 can move up and down its respective cylinder. This freedom of movement of the pistons 20 within the cylinders 18 of the modified suspension units 16 effectively modifies the action of the anti-roll bar 12 so that the vehicle displays the desired traction characteristics for off-road use. Since the hydraulic communication between the cylinders 18 is such that the cylinders 18 are interconnected to one another, then, as one piston 20 goes down in its cylinder 18, the other piston 20 rises the same amount in its respective cylinder 18. This means, in practice, that the effect of the anti-roll bar 12 upon the roll characteristics of the vehicle is, except for the resistance due to the motion of the fluid from one cylinder to the other, substantially eliminated.

In a third embodiment of the invention shown in FIGS. 5, 6 and 7 of the drawings, the suspension system for the rear axle 10 of a motor vehicle is provided with an anti-roll bar 12 which can be mechanically engaged or dis-engaged when necessary. This anti-roll bar is made up of two separate L-shaped torsion bars 32, each one of which is pivotally connected at one end to the axle 10 of the vehicle and is pivotally connected to the body of the vehicle by a rigid link 34. The other ends 38, 40 of these torsion bars 32 are connected together by means of the splined coupling device 36 shown in detail in FIGS. 6 and 7 of the drawings. Said other ends of the torsion bars are slidably socketed one within the other, and one 38 of said other ends of the torsion bars 32 has secured thereto a contoured sleeve portion 42. The other one 40 of said other ends of the torsion bars 32 is provided with a splined periphery 44 upon which is slidably mounted a splined contoured sleeve portion 46 engageable with the contours of the fixed sleeve portion 42 on the other torsion bar 32. This slidable sleeve portion 46 can be moved backwards and forwards on the splined periphery 44 in order to engage or disengage the torsion bars 32 with one another. FIG. 6 shows the torsion bars 32 in a disengaged position, that is, in the position required for the vehicle to be used in off-road conditions. In the disengaged position shown in FIG. 6 the torsion bars 32 are free to move relative to one another as the vehicle moves over rough terrain without any torsional forces being transmitted from one torsion bar to the other. On the other hand, when the two torsion bars 32 are engaged with one another, as shown in FIG. 7, then any torsional movement induced in one of the torsion bars is transmitted to the other torsion bar, and the whole unit acts as a normal anti-roll bar. Thus the two torsion bars 32 are maintained in this engaged position whenever the vehicle is used on a properly surfaced road.

In this third embodiment of the invention, it is not possible to have any degree of variation of the action of the anti-roll bar 12, since the mechanical linkage used is either fully engaged or fully disengaged, that is, the anti-roll bar 12 is either functioning or is substantially eliminated. This differs from the previous two embodiments, in which it is possible, if desired, by suitable adjustment of the valves 26, 28 concerned, to arrange for a variation in the action of the anti-roll bar 12 from a maximum to a minimum. Modifications to the coupling device used in this third embodiment can be made within the scope of the invention claimed. Thus, for example, engagement of the two torsion bars could be effected by tapered dogs in the manner of a dog clutch, the two bars being moved away from one another in order to disengage the tapered dogs. After disengagement, where the two torsion bars are independently movable relative to one another, re-engagement of the torsion bars with one another will be self aligning, even when the bars are rotationally displaced relative to one another, by reason of the tapered contours of the dogs. To avoid the necessity, in such an arrangement, of moving the torsion bars towards or away from one another and to maintain their concentricity, the engagement and disengagement could be effected by sliding splined components bearing the tapered dogs, similar to the contoured sleeve portions already described.

In a fourth embodiment of the invention, shown in FIGS. 8 and 9 of the accompanying drawings, the anti-roll bar 12 is made up of two U-shaped torsion bars 48 each one of which has one end thereof pivotally connected to one end of an axle 10 of a motor vehicle, and is pivotally connected to a vehicle body by means of a rigid link 34. The other ends 50, 52 of these torsion bars are located parallel to one another and to the longitudinal axis of the vehicle by means of a rubber-filled coupling block 54. This rubber-filled coupling block 54 is in two parts 56, 58, one part 56 being anchored to the vehicle body by means of a rigid link 60, and the other part 58 being slidably mounted on the parallel sections of the two torsion bars 48 so that it can be slid between a position in which it is in contact with said anchored part 56 of the rubber-filled coupling block, as shown in FIG. 8, and a position in which it is adjacent the free ends 50, 52 of the parallel portions of the torsion bars 48, as shown in FIG. 9. When the two portions 56, 58 of the rubber-filled coupling block 54 are in contact with one another, as shown in FIG. 8, then torsional deflection of one of the torsion bars can take place without producing any corresponding substantial torsional deflection in the other torsion bar. Thus, with the two portions 56, 58 of the rubber-filled coupling block 54 in the position shown in FIG. 8, the effective anti-roll bar 12 formed by the two torsion bars 48 has a minimal effect on the roll characteristics of the vehicle, that is, the suspension characteristics of the vehicle are adjusted for off-road conditions. On the other hand, when the slidable portion 58 of the rubber-filled coupling block 54 is in the position shown in FIG. 9, then deflection of one torsion bar 48 will result in deflection of the other torsion bar 48, that is, the two torsion bars are effectively coupled one with the other to form an overall anti-roll bar 12, so that the suspension characteristics of the vehicle are now suitable for on-road use. Alternatively, spherical jointed blocks could be used in place of the rubber-filled coupling block.

The suspension system according to the invention provides a simple, yet effective, method of firstly inhibiting body roll of a vehicle relative to the axle of the vehicle when required and, secondly, allowing up to the maximum vertical differential road wheel movement on the vehicle for severe off-road conditions. By means of such a system, it is possible for the suspension characteristics of the vehicle to be readily adjusted for either off-road use or on-road use with little or no exertion on the part of the driver of the vehicle. The embodiments of the invention described specifically within the specification cover the basic concept of the suspension system according to the invention. In any of the embodiments, body and axle attachments could equally well be transposed, i.e., the centre section of the anti-roll bar could be attached either to the axle or to the body of the vehicle. It will be readily apparent that further modifications can be made in the system to render it more sophisticated in action. In particular, for example, with the first and second embodiments of the invention described hereinbefore, it would be possible to arrange that the valves used in the system are provided with bleed means to ensure that, on changing the roll control characteristics of the vehicle from the off-road setting to the on-road setting, the possibility of the anti-roll bar being brought into action with the vehicle canted over at an unacceptable angle can be avoided.

Any one of the four of the embodiments specifically described herein could be utilised, if desired, in the suspension system of a trailer vehicle, since the concept of the roll control system according to the invention, is not limited solely to motor vehicles per se, but includes trailer vehicles as well.

What is claimed is:

1. A motor vehicle roll control system in a motor vehicle having a suspension system including at least one anti-roll bar coupled between a sprung portion of the vehicle and an unsprung portion of the vehicle, said control system including an anti-roll force adjustment means on said anti-roll bar, which anti-roll force adjustment means comprises a modified hydraulic suspension strut coupling one end of the anti-roll bar to the vehicle, said suspension strut comprising a cylinder filled with hydraulic fluid, a piston reciprocably movable within said cylinder by means of a connecting rod extending through a seal in one end of the cylinder and attached to said piston, and a fluid connection between the ends of the cylinder to allow flow of hydraulic fluid from one end of the cylinder to the other end of the cylinder; and a control means comprising a valve in said fluid connection which controls the flow of hydraulic fluid through said fluid connection, which valve, when closed, prevents effective movement of said piston within said cylinder, and thus allows said anti-roll bar to become effective in said suspension system to counteract roll being produced in said vehicle when in motion upon a road surface, and, when open, allows substantially unhindered motion of said piston within said cylinder, and thus prevents said anti-roll bar from becoming effective in said suspension system to counteract relative movement between said sprung portion and said unsprung portion of the vehicle when said vehicle is in motion over irregular terrain.

* * * * *